US 6,685,222 B2

(12) United States Patent
Winkler et al.

(10) Patent No.: US 6,685,222 B2
(45) Date of Patent: *Feb. 3, 2004

(54) VEHICLE OCCUPANT WEIGHT CLASSIFICATION SYSTEM

(75) Inventors: Gerd Winkler, Regensburg (DE); Andreas Knueppel, Troy, MI (US); Gerald Schicker, Maxhuette (DE)

(73) Assignee: Siemens AG, Munich (DE)

( * ) Notice: Subject to any disclaimer, the term of this patent is extended or adjusted under 35 U.S.C. 154(b) by 0 days.

This patent is subject to a terminal disclaimer.

(21) Appl. No.: 10/321,324

(22) Filed: Dec. 17, 2002

(65) Prior Publication Data

US 2003/0085556 A1 May 8, 2003

Related U.S. Application Data

(63) Continuation of application No. 09/900,282, filed on Jul. 6, 2001, now Pat. No. 6,578,870.
(60) Provisional application No. 60/217,579, filed on Jul. 12, 2000, provisional application No. 60/217,580, filed on Jul. 12, 2000, and provisional application No. 60/217,582, filed on Jul. 12, 2000.

(51) Int. Cl.$^7$ ............................................... B60R 21/32
(52) U.S. Cl. .................. 280/735; 701/45; 340/667; 180/273
(58) Field of Search ................. 280/735; 180/273; 701/45; 340/436, 438, 667

(56) References Cited

U.S. PATENT DOCUMENTS

| 5,232,243 A | 8/1993 | Blackburn et al. |
| 5,413,378 A | 5/1995 | Steffens, Jr. et al. |
| 5,454,591 A | 10/1995 | Mazur et al. |
| 5,474,327 A | 12/1995 | Schousek |
| 5,570,903 A | 11/1996 | Meister et al. |
| 5,605,348 A | 2/1997 | Blackburn et al. |
| 5,618,056 A | 4/1997 | Schoos et al. |
| 5,624,132 A | 4/1997 | Blackburn et al. |
| 5,626,359 A | 5/1997 | Steffens, Jr. et al. |
| 5,670,853 A | 9/1997 | Bauer |
| 5,678,854 A | 10/1997 | Meister et al. |
| 5,732,375 A | 3/1998 | Cashler |
| 5,821,633 A | 10/1998 | Burke et al. |
| 5,906,393 A | 5/1999 | Mazur et al. |
| 6,005,958 A | * 12/1999 | Farmer et al. ................. 701/45 |
| 6,015,163 A | 1/2000 | Langford et al. |
| 6,039,344 A | 3/2000 | Mehney et al. |
| 6,070,115 A | 5/2000 | Oestreicher et al. |
| 6,330,501 B1 | * 12/2001 | Breed et al. ................. 280/735 |
| 6,397,136 B1 | * 5/2002 | Breed et al. ................. 280/735 |

FOREIGN PATENT DOCUMENTS

| DE | 197 22163 | 12/1997 |
| DE | 197 52976 | 6/1998 |
| WO | WO 98/17508 | 4/1998 |
| WO | WO 98/58821 | 12/1998 |

* cited by examiner

Primary Examiner—Peter C. English

(57) ABSTRACT

A vehicle occupant classification system categorizes vehicle occupants into various classes such as adult, child, infant, etc. to provide variable control for a vehicle restraint system such as an airbag. The classification system utilizes sensors that are installed in various locations in the vehicle. The sensors are used to generate a three-dimensional profile for the vehicle occupant. Various factors can affect the accuracy of this three-dimensional profile. Fuzzy logic is used to reduce some of the inaccuracies by providing multiple decision levels for various stages of the classification. Inaccuracies are also caused by sensors shifting within the system from their original position. This condition creates offset and the system evaluates this offset and generates a correction factor to provide a more accurate three-dimensional profile. Electrically erasable programmable read-only memory is used to reduce complications and inaccuracies associated with seat occupant weight sensors that have mounting configurations that vary depending upon the vehicle.

22 Claims, 2 Drawing Sheets

VEHICLE OCCUPANT WEIGHT CLASSIFICATION SYSTEM

RELATED APPLICATIONS

This application is a continuation of Ser. No. 09/900,282 filed on Jul. 6, 2001, U.S. Pat. No. 6,578,870, which claims priority to provisional application Nos. 60/217,579 filed on Jul. 12, 2000, 60/217,580 filed on Jul. 12, 2000, and 60/217,582 filed on Jul. 12, 2000.

BACKGROUND OF THE INVENTION

1. Field of the Invention

This invention relates to a method and apparatus for classifying vehicle occupants utilizing multiple vehicle sensors to generate a three-dimensional profile.

2. Related Art

Most vehicles include airbags and seatbelt restraint systems that work together to protect the driver and passengers from experiencing serious injuries due to high-speed collisions. It is important to control the deployment force of the airbags based on the size of the driver or the passenger. When an adult is seated on the vehicle seat, the airbag should be deployed in a normal manner. If a small child is sitting on the seat, then the airbag should not be deployed or should be deployed at a significantly lower deployment force. One way to control the airbag deployment is to monitor the weight and position of the seat occupant. The weight information and position information can be used to classify seat occupants into various groups, e.g., adult, child, infant, and occupant close to dashboard, etc., to ultimately control the deployment force of the airbag.

There are many different systems for measuring weight and determining the position of a seat occupant. These systems use sensors placed in various locations within the vehicle to continuously monitor the position and weight of the occupants. For example, a typical vehicle may include load cells mounted within the seat to measure occupant weight and optical sensors mounted to the dashboard to determine the position of the occupant. Information from the sensors is compiled by a central processing unit and the occupant is classified. Airbag deployment is then controlled based on this classification.

Current classification systems typically use a decision tree method for assigning a class to an occupant. The decision tree method offers only a limited number of comparison tests, which can lead to classification inaccuracies. Further, the decision tree method is unable to adapt to accommodate changes within the system as the system operates over time.

Another problem with current classification systems is that classification accuracy is affected by the number and orientation of seat sensors. Each vehicle can have a different mounting requirement for seat sensors. Smaller vehicles with small seats and limited packaging space, often cannot accommodate a preferred number of sensors or a preferred sensor mounting orientation, which can result in inaccuracies. Further, each different sensor mounting configuration requires its own software, which increases system cost.

System inaccuracies are also caused by sensor shifting. Over time, sensors within the vehicle can be shifted from their original locations creating offset. Thus, when there is offset, the classification system is classifying occupants assuming that the sensors are still in their original locations while in practice the sensors are providing measurements from other locations.

Thus, it is desirable to have a method and apparatus for classifying seat occupants that can reduce inaccuracies caused by sensor shifting, variable sensor mounting configurations, and limited decision processes. The method and apparatus should also be able to adapt with system changes over time in addition to overcoming the above referenced deficiencies with prior art systems.

SUMMARY OF THE INVENTION

The subject invention includes a method and apparatus for classifying vehicle occupants utilizing multiple vehicle sensors to generate a three-dimensional profile.

The classification system utilizes sensors that are installed in various locations throughout the vehicle. The sensors transmit data to a central processing unit that generates a three-dimensional profile representative of the vehicle occupant. Fuzzy logic is used to reduce inaccuracies by providing multiple decision levels for various stages of the classification. The central processing unit also reduces inaccuracies caused by offset by utilizing a measuring function to determine the amount of offset and to generate an appropriate correction factor to provide a more accurate three-dimensional profile. Electrically erasable programmable read-only memory (EEPROM) is used to reduce inaccuracies associated with seat occupant weight sensors that have mounting configurations that vary depending upon the vehicle.

The subject invention provides an improved method and apparatus that more accurately classifies vehicle occupants. The classification information is used for vehicle restraint system control. These and other features of the present invention can be best understood from the following specification and drawings, the following of which is a brief description.

DETAILED DESCRIPTION OF AN EXEMPLARY EMBODIMENT

Figure 1:
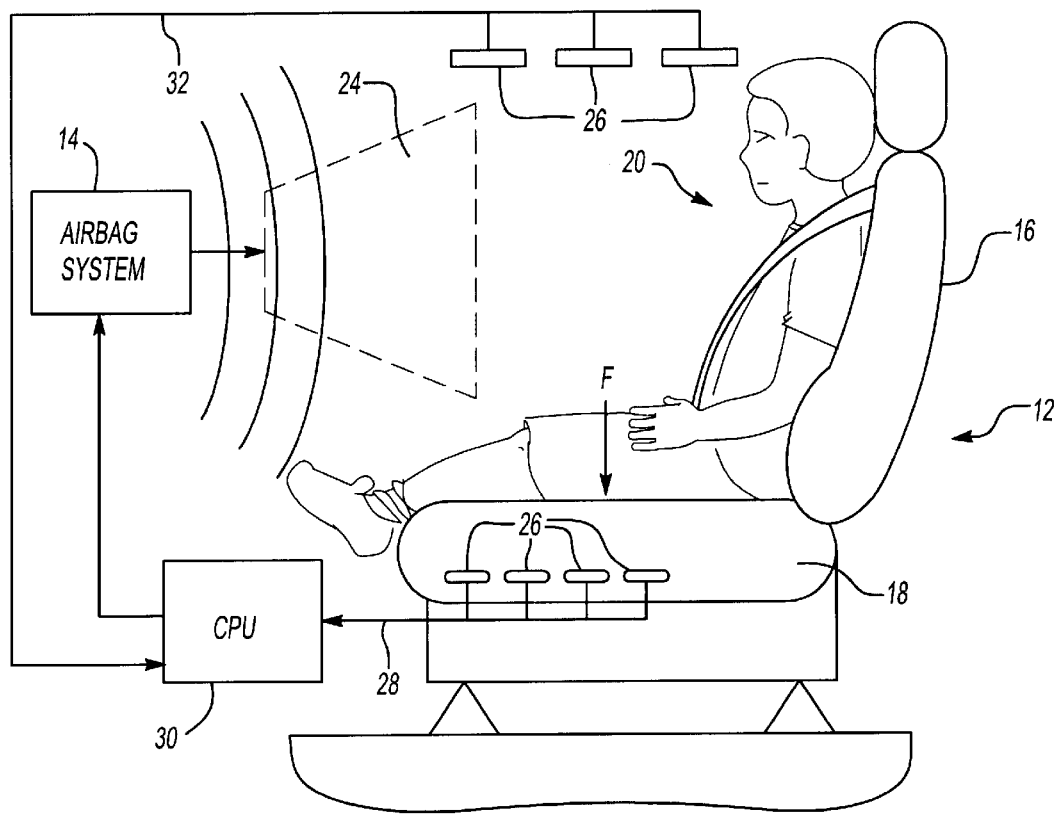
FIG. 1 is a schematic representation of a vehicle seat and airbag system incorporating the subject invention.

A vehicle includes a vehicle seat assembly, shown generally at 12 in FIG. 1, and a restraint system including an airbag system 14. The seat assembly 12 is preferably a passenger seat and includes a seat back 16 and a seat bottom 18. A vehicle occupant 20 exerts a force F against the seat bottom 18. The vehicle occupant 20 can be an adult, child, or infant in a car seat.

The airbag system 14 deploys an airbag 24 under certain collision conditions. The deployment force for the airbag 24, shown as deployed in dashed lines in FIG. 1, varies depending upon the type of occupant that is seated on the seat 12. For an adult, the airbag 24 is deployed in a normal manner. If there is child or an infant in a car seat secured to the vehicle seat 12 then the airbag 24 should not be deployed or should be deployed at a significantly lower deployment force. Thus, it is important to be able to classify seat occupants in order to control the various restraint systems.

One way to classify occupants is to monitor and measure the weight force F exerted on the seat bottom 18 and to monitor and determine the position of the occupant within the vehicle. Multiple sensors 26 are mounted throughout the vehicle to determine seat occupant weight and position. Some sensors 26 are preferably mounted within the seat bottom 18 for generating occupant weight signals 28, each representing portions of the occupant weight exerted against each respective seat sensor 26. The signals 28 are transmitted to a central processing unit (CPU) 30 and the combined output from the sensors 26 is used to determine seat occupant weight. This process will be discussed in greater detail below.

Typically, seats used in different vehicles require different sensor mounting configurations. If differing designs of the seat sensor unit are used, the sensor arrangement can be divided into zones. A reference cell can lie in each zone that can be used for compensation of the sensor cells. Maximum flexibility and minimum electrically erasable programmable read-only memory (EEPROM) requirements will be realized in the assignment of the reference cells and the zones of the sensor arrangement to a virtual arrangement of sensor cells. By the use of EEPROM programmable zone coding, each individual zone can be unambiguously assigned to the virtual sensor arrangement. For example, only four (4) bytes of EEPROM will be necessary for four (4) zones with this coding to achieve an unambiguous, yet flexible, assignment. By using this design, it is possible to achieve high system flexibility with only minimum memory requirements. This will be discussed in further detail below.

Other sensors 26 are mounted within the vehicle to determine occupant position. These sensors generate position signals 32 that are transmitted to the CPU 30. The signals 28, 32 are combined to generate a three-dimensional profile that is used to classify the occupant.

The sensors 26 mounted within the vehicle can be any known sensors in the art including contact and/or non-contact sensors. For example, the sensors mounted within the seat are preferably load cells that utilize strain gages. The position sensors can be optical sensors or other similar sensors. The CPU 30 is a standard microprocessing unit the operation of which is well known and will not be discussed in detail. A single CPU 30 can be used to generate the three-dimensional profiles or multiple CPUs 30 working together can be used.

Once seat occupant weight and position is determined, the occupant is classified into one of any of the various predetermined occupant classes, e.g., adult, child, infant, close to airbag deployment area, far from airbag deployment area, etc. Vehicle restraint systems are then controlled based on the classification assigned to the occupant. For example, if the classification indicates that an adult is in the seat 12 then the airbag 24 is deployed in a normal manner. If the classification indicates that a child or infant is the seat occupant then the airbag 24 will not be deployed or will be deployed at a significantly lower deployment force.

Fuzzy logic is used to reduce inaccuracies that result from classification of persons and objects by using one or several measurements from a three-dimensional input profile. Various features will be determined from the input profile, which will have to be combined in a suitable comparison logic unit in order to achieve correct classification of the person. Previously, decision trees were used to compare features. The disadvantage with this method is that it provides only a limited number of comparison tests and cannot be used adaptively.

Instead, the subject invention uses fuzzy logic to provide multiple links that can lead to more precise classifications. Fuzzy logic is a type of logic that recognizes more than simple true and false values. With fuzzy logic, propositions can be represented with degrees of truthfulness and falsehood. Using fuzzy logic results in higher success rates for classifications and results are achieved with significantly less effort and computing time because of the use of a flexible, adaptive fuzzy set.

Classification inaccuracies can also be caused by system offset. Certain calculated features can be reproduced inadequately because of the actual position of the three-dimensional input values with regard to the sensor arrangement, i.e. the actual position of the input values is different than the original sensor arrangement thereby creating offset. However, since this position offset in the system is known, with the help of additional measurements, these features can be affected adaptively in order to improve classification accuracy. A measuring function is used to evaluate the position offset of the input values from the sensor arrangement and at the same time prepares a correction factor in order to adjust the features that have not been calculated adequately. Because an adaptive solution is used, an effect can be made selectively on the respective conditions of the three-dimensional input value, whether there is position offset or not. It is possible to have a gradual effect on the features in contrast to fixed threshold value switching of prior systems. The inverse of this modification can also be controlled using this mechanism. This will be discussed in further detail below.

Figure 2:
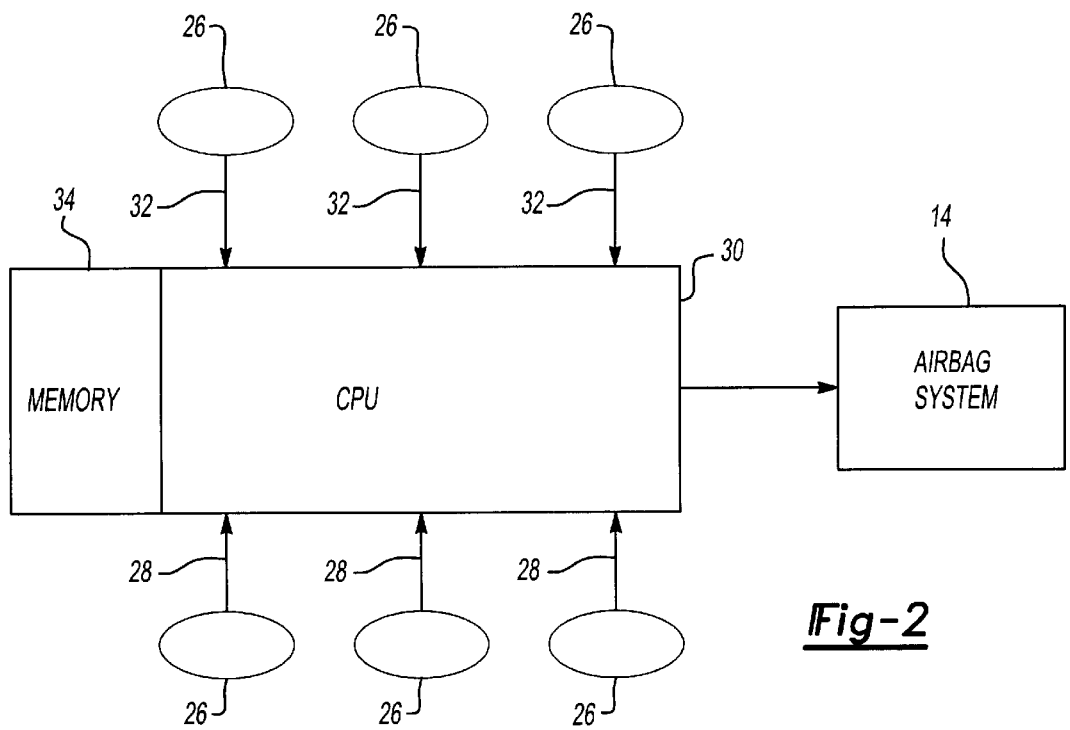
FIG. 2 is a schematic representation of the subject system.

As discussed above, and as schematically shown in FIG. 2, the system for classifying vehicle occupants includes multiple sensors 26 mounted within a vehicle to generate a plurality of occupant measurement signals 28, 32, which are transmitted to a CPU 30 which generates a three-dimensional profile for occupant classification by using fuzzy logic. The CPU 30 includes a memory unit 34 for storing an information factor for comparison to the three-dimensional profile. The memory unit 34 can be part of the CPU 30 or can be a separate unit associated with the CPU 30 depending upon the application. The CPU 30 generates a correction factor if the three-dimensional profile varies from the information factor by a pre-determined amount. If correction is required, the CPU 30 generates a corrected three-dimensional profile that is used to classify the occupant. If correction is not required, then the CPU 30 uses the original information. The airbag system 14 controls airbag deployment based on this classification.

The information factor that is used for comparison to the three-dimensional profile is based on various data inputs. One part of the information factor includes a predefined or original sensor arrangement with known sensor positions and calibrations. The three-dimensional profile generated by the sensor measurements represents actual sensor position input values. The CPU 30 compares the actual sensor position input values to the predefined sensor arrangement to determine an offset. The measuring function is used to determine the amount of offset and to generate the correction factor to adjust the actual sensor position input values for the corrected three-dimensional profile.

Figure 3:
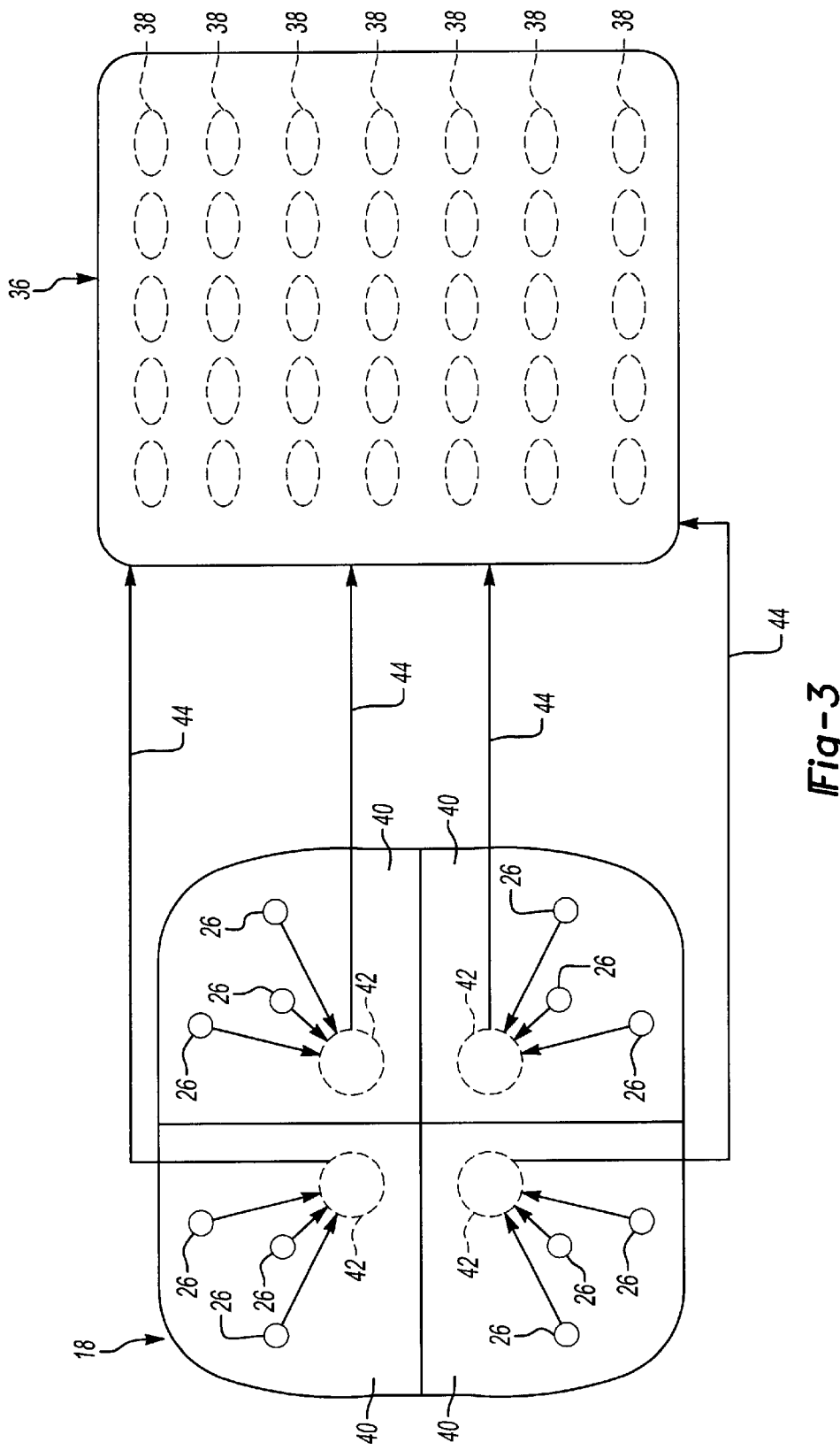
FIG. 3 is a schematic representation of a seat sensor configuration incorporating the subject invention.

Another part of the information factor is seat sensor mounting configurations. As discussed above, different seats have a different number of seat sensors 26 mounted in any of various mounting configurations. For example, as shown in FIG. 3, a certain number of seat sensors 26 are mounted within a seat bottom 18. The information factor includes a virtual sensor matrix, shown generally at 36 that defines a predetermined maximum or ideal number of virtual weight sensor positions 38. Typically this maximum or ideal number of virtual weight sensor positions 38 is greater than the actual number of sensors 26 mounted within the seat bottom 18.

To permit the use of common system hardware and software for various different seat sensor mounting configurations, the CPU 30 and EEPROM 34 divide the seat sensors 26 into a plurality of zones 40. Any number of zones 40 can be used and four (4) zones are shown in the preferred embodiment of FIG. 3. Each zone 40 covers a subset of the virtual weight sensor positions 38. A reference cell 42 is assigned to each zone 40 for compiling the weight signals 28 from that zone 40 to generate weight zone signals 44 representing data for the respective subset of the virtual weight sensor positions 38. The CPU 30 and EEPROM 34 map each weight zone signal 44 into the virtual sensor matrix 36 such that all of the virtual weight sensor positions 38 are filled. The CPU 30 then determines seat occupant weight based on the virtual sensor matrix 36 to generate the corrected three-dimensional profile.

The method for classifying vehicle occupants is discussed in detail below. First a plurality of sensors 26 are mounted within the vehicle which generate a plurality of occupant measurement signals 28, 32 in response to an occupant or object being present within the vehicle. The three-dimensional profile is determined based on these occupant measurement signals and is compared to an information factor. A correction factor is applied if the three-dimensional profile varies from the information factor by a predetermined amount to generate a corrected three-dimensional profile. The information factor is a compilation of various features and the determination of whether or not to apply a correction factor is dependent upon the specific feature in question. The occupant is then classified based on either the original or corrected three-dimensional profile.

In the preferred embodiment, fuzzy logic is used to classify the occupant. Specifically, fuzzy logic is used to generate the three-dimensional profile, the corrected three-dimensional profile, and occupant classification.

Also in the preferred embodiment, a plurality of weight sensors 26 are installed in the vehicle seat to determine occupant weight. The sensors 26 generate weight signals 28 in response to a weight force F being applied against the seat bottom 18. The information factor includes the virtual sensor matrix 36, which defines a predetermined number of virtual weight sensor positions 38. The weight signals 28 are mapped into the virtual weight sensor positions 38 to determine seat occupant weight as part of the three-dimensional profile. The correction factor is applied if the number of weight sensors 26 is less than the predetermined number of virtual weight sensor positions 38. Applying the correction factor includes dividing the weight sensors 26 into a plurality of zones 40 with each zone 40 defined as covering a subset of the virtual weight sensor positions 38. Each zone 40 is assigned a reference cell 42 for compiling the weight signals 28 from that zone 40 to form a weight zone signal 44 representing data for the subset of the virtual weight sensor positions 38. Each weight zone signal 44 is mapped into the virtual sensor matrix 36 such that all virtual weight sensor positions 38 are filled and seat occupant weight is determined from the virtual sensor matrix 36 for use in generating the corrected three-dimensional profile. The subset of virtual weight sensor positions 38 for each zone 40 includes a greater number of sensor positions than the number of sensors 26 assigned to each zone 40. The CPU 30 and EEPROM 34 work in conjunction to generate the virtual matrix 36, assign zones 40, and map signals into the matrix 36.

Also in the preferred embodiment the three-dimensional profile is based on an actual position of three-dimensional input values while the information factor includes a defined sensor arrangement. The actual position is compared to the defined sensor arrangement to determine if there is offset. A measuring function is used to evaluate the offset and to generate the correction factor to adjust the input values to generate the corrected three-dimensional profile. This allows the same system software to be used for all offset values.

The subject invention provides a method and apparatus for classifying seat occupants that reduces inaccuracies caused by sensor shifting, variable sensor mounting configurations, and limited decision processes. The subject method and apparatus is also able to adapt with system changes over time.

Although a preferred embodiment of this invention has been disclosed, it should be understood that a worker of ordinary skill in the art would recognize many modifications come within the scope of this invention. For that reason, the following claims should be studied to determine the true scope and content of this invention.

We claim:

1. A method for classifying vehicle occupants comprising the steps of:
   (a) mounting a plurality of occupant sensors within a vehicle;
   (b) generating a plurality of occupant characteristic values from the occupant sensors in response to an occupant being present within the vehicle;
   (c) generating an original three-dimensional profile based on the occupant characteristic values;
   (d) comparing the original three-dimensional profile to an information factor;
   (e) applying a correction factor if the original three-dimensional profile varies from the information factor by a pre-determined amount to generate a corrected three-dimensional profile; and
   (f) using fuzzy logic to classify the occupant based on the occupant characteristic values.

2. The method according to claim 1 including the step of using fuzzy logic to generate the original three-dimensional profile and the corrected three-dimensional profile.

3. The method according to claim 1 wherein the information factor includes a virtual occupant sensor matrix defining a predetermined number of virtual occupant sensor positions and including the step of mapping the occupant characteristic values into the virtual occupant sensor positions to determine seat occupant weight or position as part of the original three-dimensional profile.

4. The method according to claim 3 including applying the correction factor if the number of occupant sensors is less than the predetermined number of virtual occupant sensor positions.

5. The method according to claim 3 including using electrically erasable programmable read-only memory for generating the virtual occupant sensor matrix and mapping the occupant characteristic values into the virtual occupant sensor positions.

6. The method according to claim 1 including the steps of establishing at least one initial occupant sensor value, comparing a subsequently measured occupant sensor value to the initial occupant sensor value to define a current occupant sensor value, identifying offset when the current occupant sensor value varies from the initial occupant sensor value, and applying the correction factor to correct for the offset.

7. The method according to claim 6 further including the step of determining an amount of offset between the initial occupant sensor value and a shifted occupant sensor value and applying the correction factor to correct the original three-dimensional profile based on the amount of offset.

8. The method according to claim 7 including the step of installing the plurality of occupant sensors within the vehicle to define an initial occupant sensor position and wherein over a period of time at least one of the occupant sensors moves from an initial installed position to a shifted occupant sensor position with the offset being created by the shifted occupant sensor position.

9. A method according to claim 8 including the step of automatically adjusting all occupant characteristic values affected by the offset by the correction factor.

10. The method according to claim 1 further including the steps of: generating a first occupant sensor value representing a first occupant characteristic; generating a second occupant sensor value representing the first occupant characteristic subsequent to generating the first occupant sensor value; comparing the second occupant sensor value to the first occupant sensor value; identifying offset when the second occupant sensor value varies from the first occupant sensor value; and applying the correction factor to correct for the offset and to generate the corrected three-dimensional profile.

11. The method according to claim 10 further including the steps of: providing the first occupant characteristic as occupant weight; mounting a plurality weight sensors within a vehicle seat; dividing the vehicle seat into a plurality of zones with each zone including at least one of the weight sensors; assigning a reference cell to each zone; generating weight signals from each of the weight sensors; generating the original three-dimensional profile based on the weight signals; combining weight signals from each zone to generate a corresponding zone output; mapping the zone outputs into a virtual sensor matrix; and determining occupant weight from the virtual sensor matrix for use in generating the corrected three-dimensional profile.

12. A system for classifying vehicle occupants including:
a plurality of occupant sensors mounted within a vehicle to generate a plurality of occupant characteristic values in response to an occupant being present within the vehicle;
a central processing unit for receiving said occupant characteristic values and using fuzzy logic to classify the occupant based on said occupant characteristic values wherein said central processing unit generates an original three-dimensional profile based on said occupant characteristic values, compares said original three-dimensional profile to an information factor, and applies a correction factor if said original three-dimensional profile varies from said information factor by a pre-determined amount to generate a corrected three-dimensional profile for classifying the occupant.

13. A system according to claim 12 including a memory unit for storing said information factor for comparison to said original three-dimensional profile wherein said central processing unit classifies the occupant based on either the original or corrected three-dimensional profile.

14. A system according to claim 13 wherein said central processing unit uses fuzzy logic to generate the original three-dimensional profile and the corrected three-dimensional profile.

15. A system according to claim 12 wherein said information factor includes a virtual occupant sensor matrix defining a predetermined number of virtual occupant sensor positions and wherein said central processing unit maps said occupant characteristic values into said virtual occupant sensor positions to determine seat occupant weight or position as part of said original three-dimensional profile.

16. A system according to claim 15 including an electrically erasable programmable read-only memory that generates said virtual occupant sensor matrix and maps said occupant characteristic values into said virtual occupant sensor positions.

17. A system according to claim 12 wherein said central processing unit defines a first occupant sensor value, generates a second occupant sensor value subsequent to said first occupant sensor value being defined, detects offset if said second occupant sensor value is different than said first occupant sensor value, and applies the correction factor to correct for said offset.

18. A system according to claim 17 wherein said central processing unit determines an amount of offset between the first sensor value and the second sensor value and applies the correction factor to correct said original three-dimensional profile based on the amount of offset.

19. A system according to claim 18 wherein said plurality of occupant sensors is installed within the vehicle to define an initial occupant sensor position and wherein over a period of time at least one of said occupant sensors moves from an initial installed position to a shifted occupant sensor position with the offset being created by the shifted occupant sensor position.

20. A system according to claim 18 wherein said central processing unit automatically adjusts all occupant characteristic values affected by the offset by the correction factor.

21. A system according to claim 17 wherein said first and second occupant sensor values comprise occupant weight and wherein said plurality of occupant sensors includes a plurality weight sensors mounted within a vehicle seat, said vehicle seat being divided into a plurality of zones with each zone including at least one of the weight sensors and having a reference cell assigned to each zone, wherein said central processing unit generates the original three-dimensional profile based on weight signals from the weight sensors, combines weight signals from each zone to generate a corresponding zone out put, maps the zone outputs into a virtual sensor matrix, and determines occupant weight from the virtual sensor matrix for use in generating the corrected three-dimensional profile.

22. A system according to claim 12 including an airbag system wherein airbag system deployment is controlled based on the classification of the occupant.

* * * * *